United States Patent [19]

Scherrer

[11] 4,436,444

[45] Mar. 13, 1984

[54] MECHANISM FOR CONNECTING AND DISCONNECTING CRANE SECTIONS

[75] Inventor: Edward P. Scherrer, North Liberty, Iowa

[73] Assignee: FMC Corporation, Chicago, Ill.

[21] Appl. No.: 342,298

[22] Filed: Jan. 25, 1982

[51] Int. Cl.³ .......................... F16D 1/00; F16G 11/00
[52] U.S. Cl. ...................................... 403/24; 403/165; 403/322; 212/175
[58] Field of Search ............... 212/175, 179, 180, 247, 212/253, 181; 403/322, 326, 316, 317, 165, 321, 24, 25; 285/321, 277

[56] References Cited

U.S. PATENT DOCUMENTS

| | | | |
|---|---|---|---|
| 1,052,439 | 2/1913 | Crosby | 212/232 |
| 1,473,935 | 11/1923 | Horton | 212/252 |
| 2,877,732 | 3/1959 | Eaton | 285/321 X |
| 3,521,911 | 7/1970 | Hanes et al. | 285/27 |
| 3,921,817 | 11/1975 | Petrik et al. | 212/181 |
| 3,923,407 | 12/1975 | Jensen et al. | 403/165 |

Primary Examiner—Andrew V. Kundrat
Attorney, Agent, or Firm—Ronald C. Kamp; Richard B. Megley

[57] ABSTRACT

An improved mechanism for connecting and disconnecting crane sections having a split locking ring positionable when contracted within a groove in one crane section and expandable into a groove in one crane section and expandable into a groove in the other crane section, with a double-acting ram connected at the free ends of the locking ring to control contraction and expansion thereof. A single acting ram is connected to provide a radial force at the heel of the locking ring when the latter is expanded.

14 Claims, 7 Drawing Figures

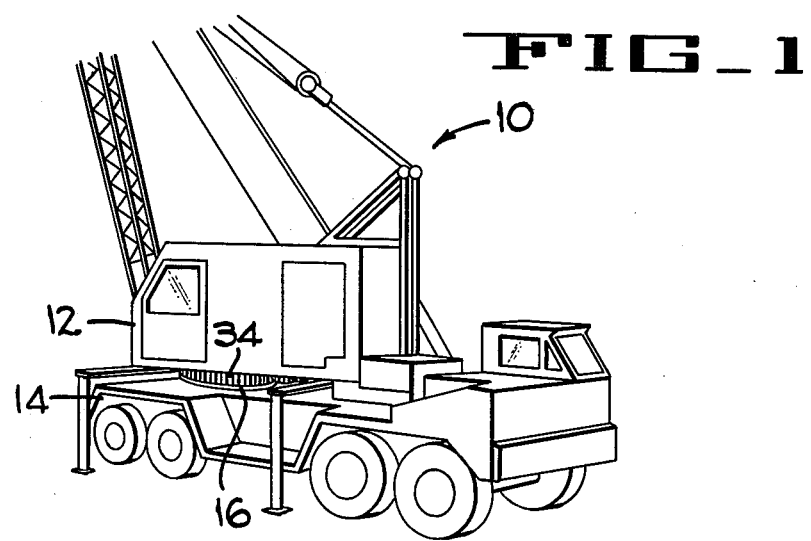
FIG_1
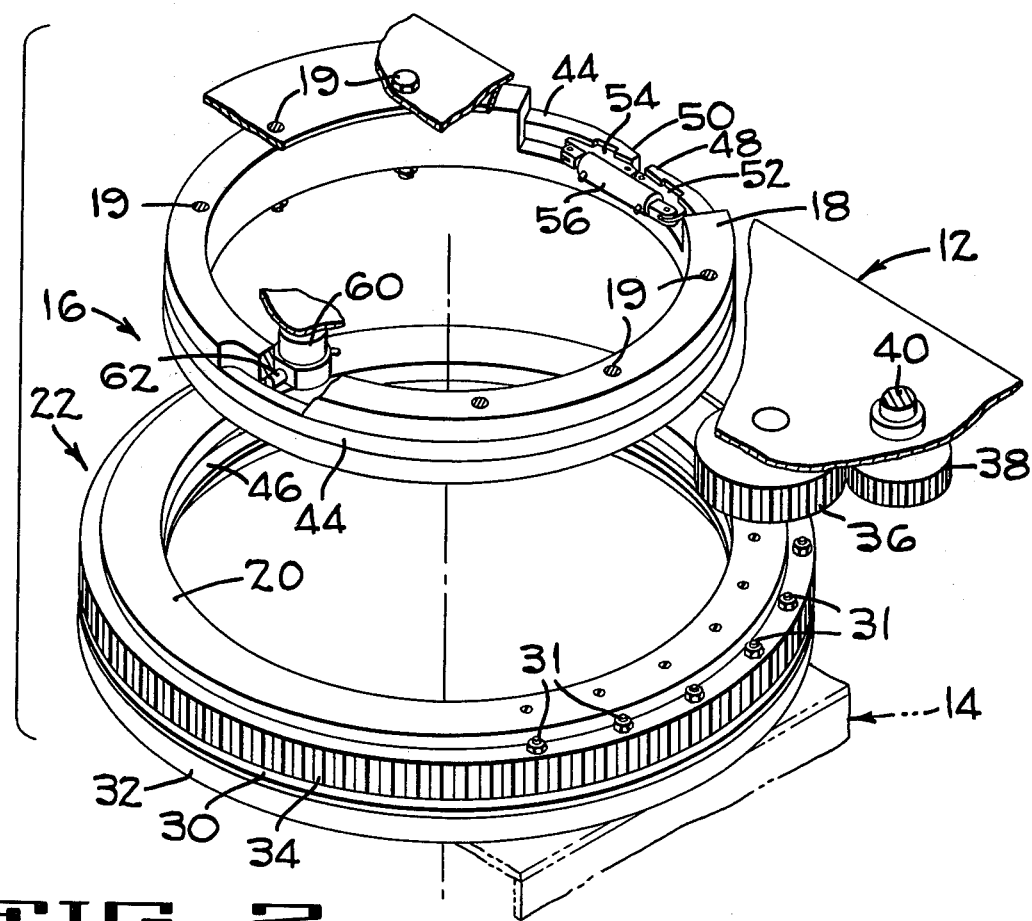
FIG_2

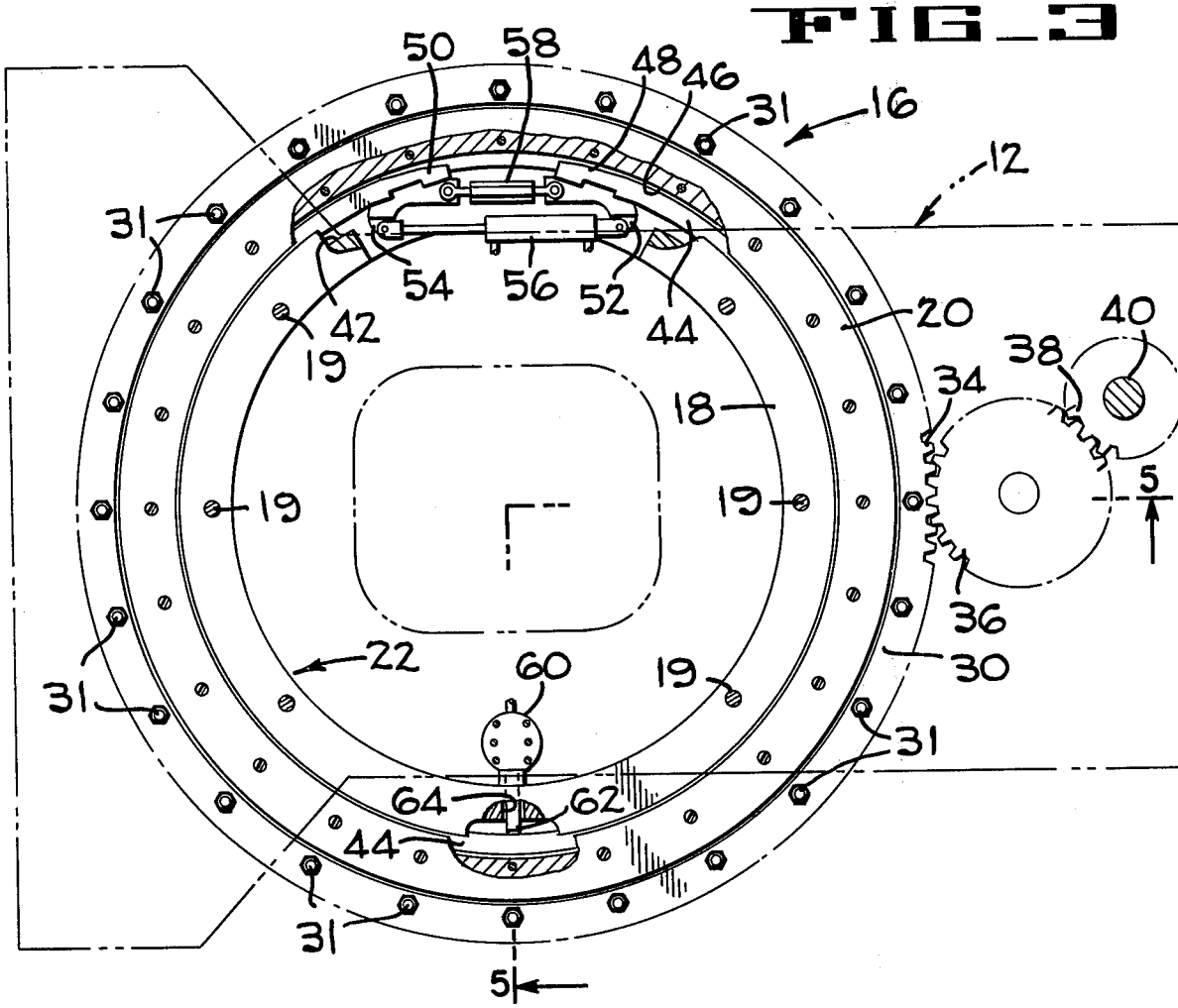
FIG_3
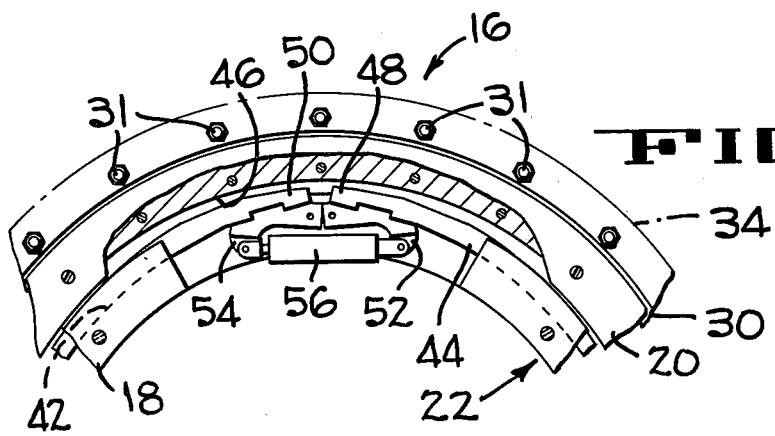
FIG_4
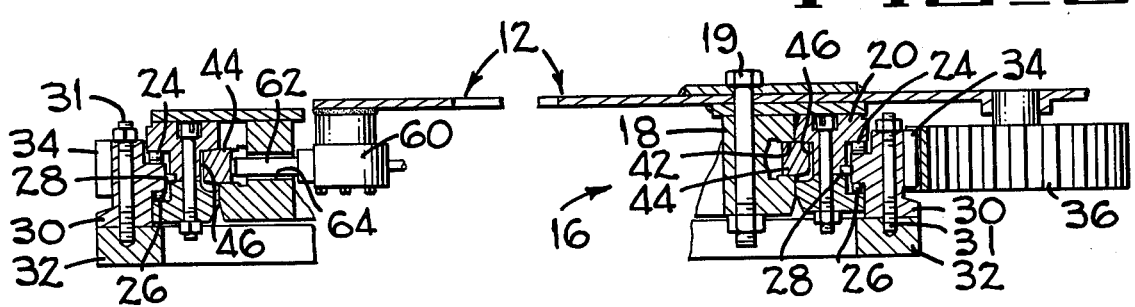
FIG_5

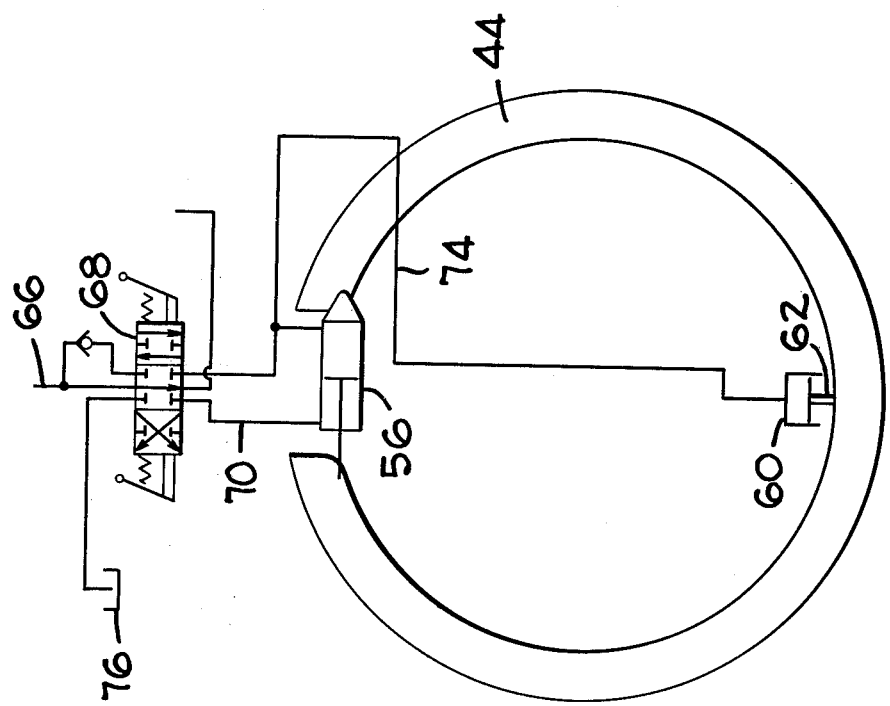
FIG_6
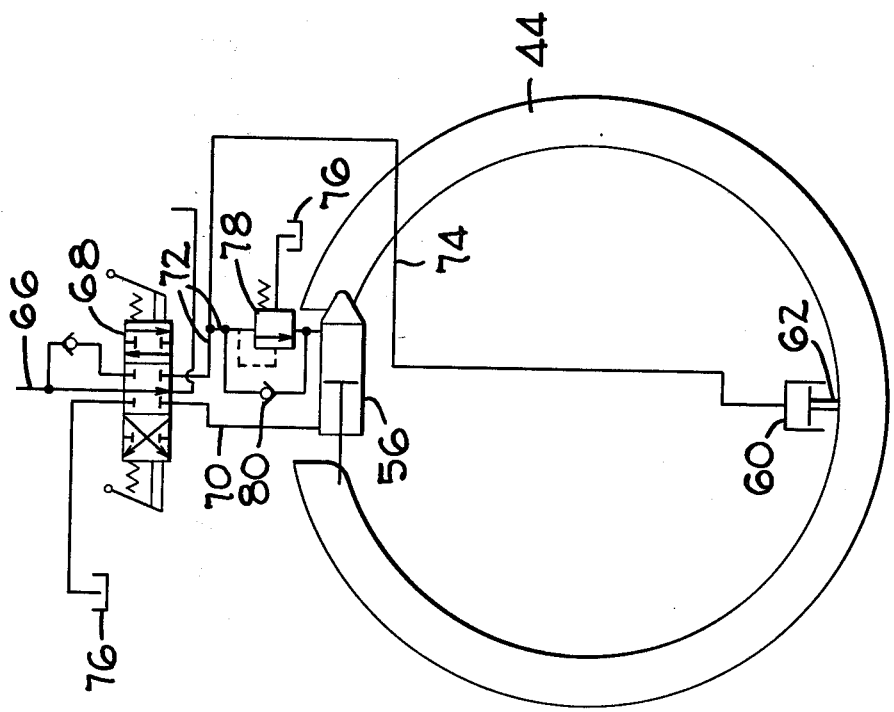
FIG_7

MECHANISM FOR CONNECTING AND DISCONNECTING CRANE SECTIONS

BACKGROUND AND SUMMARY OF THE INVENTION

This invention represents an improvement over that disclosed in U.S. Pat. No. 3,923,407 issued Dec. 3, 1975, to L. B. Jensen and R. E. Thune. The invention disclosed therein functions quite well from a structural standpoint. That is, the locking ring securely holds the upper works to the car body or lower works and yet permits separation and reattachment, i.e. undecking and decking, without affecting any of the torqued bolt connections in the turntable assembly.

It has been found that the locking ring, especially at that point diametrically opposite the actuating cylinder, i.e. the heel of the locking ring, is difficult to seat completely. A complete peripheral seating between the locking ring and the facing groove is important in order to achieve the proper strength in this connection. Complete seating is achieved with the structural arrangement in the aforementioned patent by shifting the weight of the crane upper around the turntable. This was done through adjustments to the sling members suspending the crane upper from a helper crane. This variation changed the location of maximum frictional forces and deflections resulting from the weight of the upper being imposed on the lower. The shifting of the weight caused the locking ring to thereby "work" into its properly fully seated position in which it engages the groove provided on one of the bearing races in the turntable. This process, while effective, was cumbersome and time consuming.

The present invention provides a means for initially seating the locking ring, eliminates the need for "working" the locking ring into position, simplifies the reattachment procedure and accomplishes the reattachment faster and with greater assurance.

BRIEF DESCRIPTION OF THE DRAWINGS

FIG. 1 is a fragmentary pictorial view of a crane embodying the present invention.

FIG. 2 is an expanded view, with portions broken away, of the turntable portion of the crane shown in FIG. 1.

FIG. 3 is a top plan view of the turntable in FIG. 2 in its assembled relationship.

FIG. 4 is a fragmentary plan with the locking ring expanded view of the turntable shown in FIG. 3 with the locking ring contracted.

FIG. 5 is a cross-sectional view taken on line 5—5 of FIG. 3.

FIG. 6 is a hydraulic schematic of one embodiment of circuit arrangement according to the present invention.

FIG. 7 is a hydraulic schematic similar to FIG. 6 of another embodiment of circuit arrangement for accomplishing the purposes of the present invention.

DETAILED DESCRIPTION

Referring now to the drawings, a crane, indicated generally at 10 and illustrated in FIG. 1 as a truck crane, but which may be any type of crane, has an upper 12 and a lower 14 which are connected for relative rotation by a turntable 16. The turntable 16 includes a circular retainer 18 secured to the upper 12 by bolts 19 receivable within the inner race 20 of a turntable bearing assembly 22, which includes upper and lower roller bearings 24 and 26 respectively, and a thrust roller bearing 28 retained between the inner race 20 and the outer race 30 for facilitating free relative rotation therebetween. The outer race 30 is secured by bolts 31 to a car body ring 32 which is carried by the crane lower 14. An external tooth ring gear 34 is formed on the outer race 30 and meshes with an idler gear 36, which is driven by a pinion gear 38 on the output shaft 40 of a reversible, rotary hydraulic motor (not shown). The gears 36 and 38 are journalled on the upper 12 and provide the power for swinging the upper 12 relative to the lower 14.

The retainer 18 is provided with a peripheral groove 42 and has an expandable, locking ring 44 positioned therein. The depth of the groove 42 is at least equal to the width of the locking ring 44 so that the latter, when contracted, may be completed received within the groove 42. The inner wall of the inner race 20 is provided with a peripheral groove 46 capable of receiving a portion of locking ring 44 when the latter is expanded. The grooves 42 and 46 are vertically positioned so that they are facing and substantially aligned when the upper 12 is in contact with the upper surface of the inner race 20. The locking ring 44 may then be expanded to engage the groove 46 while remaining within the groove 42, effectively locking the retainer 18, and thus the entire upper 12, to the inner race 20 and the entire lower 14.

In order to expand and contract the locking ring 44, it is split to form free ends 48 and 50 with inward extending ears 52 and 54 formed on the ends 48 and 50 respectively. A double-acting hydraulic ram 56 is connected between the ears 52 and 54 so that extension of the ram 56 will exert a force thereon in a substantially circumferential direction to thereby expand the locking ring 44, and similarly contraction of the ram will contract the ring. Once the ring 44 is expanded, a turn buckle 58 which is manually adjusted to the proper length, is secured between the ears 52 and 54, as shown in FIG. 3, to mechanically hold the locking ring 44 in its expanded position. The turn buckle 58, is, of course, removed to permit contraction of the ring 44, as shown in FIG. 4, for the undecking or disassembly operation, but while in place during assembled operation of the crane, turn buckle 58 precludes the need for hydraulic pressure to maintain the locking ring 44 in its expanded position.

The ends 48 and 50 of the ring 44 are positioned to the side of the turntable assembly 20, or 90 degrees from the boom foot, which as shown is toward the left side of FIG. 2. This positions the split in the ring 44 in a relatively low stress area of the turntable. A single-acting hydraulic ram 60 is attached to the base plate of the upper 12 diametrically opposite the split in ring 44 or adjacent the heel thereof, and is provided with an extended rod or plunger 62. The plunger 62 extends through an opening 64 in the retainer 18 to engage the inner wall of the locking ring 44 and is oriented to exert a force in a radial direction on the ring 44. The hydraulic rams 56 and 60 are arranged in a hydraulic circuit so that seating of the heel of ring 44 will be achieved just prior to, or at the same time as the free ends 48 and 50 of the ring 44. FIG. 6 illustrates such a hydraulic circuit. Hydraulic pressure is supplied through conduit 66 to a manually actuated valve 68. The valve 68 communicates with the rod end and head end of ram 56 through conduit 70 and 72 respectively. A conduit 74 connects the head end of the ram 56 in parallel with the head end of single-acting ram 60. Shifting valve 68 to pressurize conduit 72 will cause pressure to be exerted to extend both rams 56 and 60. In order to ensure that the ring heel is seated first, the bore diameter of ram 60 is made larger than the bore diameter of the ram 56. Thus with the hydraulic pressure being essentially the same, the force acting through the plunger 62 will be greater than the force exerted by the ram 56. The greater force will seat the ring 44 in the vicinity of the plunger 62 just prior to or at the same time as the free ends. Even though pressure will flow to the path of least resistance, the relative diameters of rams 56 and 60 can be sized so that ram 60 will extend fully to seat ring 44 at the heel thereof just prior to, or at the same time as the free ends 48 and 50. The application of force to seat the heel at the same time forces are applied to seat the free ends eliminates the binding due to friction which occurs when the force is applied only to the free ends. Since, the resistance to seating with application of force to both the heel and free ends tends to more evenly distribute the frictional forces opposing seating around the periphery of the ring.

Movement of the valve 68 to simultaneously connect the conduit 70 with pressure while connecting conduit 72 to reservoir 76 will cause the ram 56 to contract pulling the free ends together. As the free ends of ring 44 are pulled together by the contraction of ram 56, the heel of the ring 44 will also be extracted from groove 46, causing the single-acting ram 60 to also collapse which is made possible by the connection of ram 60 to reservoir through valve 68. Thus, the ring 44 will be fully contracted into the groove 42 permitting undecking of the crane upper 12.

Referring now to FIG. 7, a modified form of hydraulic circuit is provided that gives a greater assurance of engaging the heel prior to engagement of the free ends of the ring 44. This circuit is the same as that in FIG. 6, except a sequence valve 78 is added in that portion of conduit 72 between the ram 56 and its connection with conduit 74. The sequence valve 78 isolates the head end of ram 56 from the pressure upstream in conduit 72 when the valve 68 is shifted to pressurize conduit 72. Thus, directing pressure only to ram 60 through conduit 74. When the pressure in conduit 74 reaches a predetermined level, it is sensed through the pilot line in valve 78 causing the sequence valve 78 to shift and transmit fluid pressure to the head end of ram 56, while maintaining that predetermined pressure in conduit 74. Maintenance of such predetermined pressure precludes the possibility of the heel of the retaining ring 44 from being withdrawn from the groove 46 when the ram 56 is connected to the pressure source. A check valve 80 is connected in parallel with the sequence valve and permits fluid flow only from the head end of ram 56 toward the valve 68. Thus, when the valve 68 is moved to connect the rod end of ram 56 with pressure the head end will be connected to reservoir 76 through the check valve 80 permitting the ram 56 to collapse. The check valve 80 and sequence valve 78 therefore cooperate to permit fluid flow to the head end of the ram 56 only when a predetermined pressure has been reached, but permits free exhaust of fluid from the head end of ram 56 when the valve 68 connects conduit 72 with reservoir 76.

Although the best modes contemplated for carrying out the present invention have been herein shown and described, it will be apparent that modification and variation may be made without departing from the spirit of the invention as defined by the scope of the appended claims.

What is claimed is:

1. In a crane having a split locking ring for assembling and disassembling the crane upper respectively to and from the crane lower, a first hydraulic ram connected between the free ends of the ring to exert substantially circumferencial forces to expand and contract the ring; the improvement comprising:
   a second hydraulic ram arranged to exert a substantially radial force on said ring when assembling said crane.

2. The invention according to claim 1, wherein; said second ram is located along the periphery of the ring at a location remote from said first ram.

3. The invention according to claim 1, wherein; said second hydraulic ram is positioned to exert an outward force on the heel of said ring.

4. The invention according to claim 2 or 3, wherein; said second hydraulic ram has a bore diameter greater than the bore diameter of said first hydraulic ram.

5. The invention according to claim 4 wherein said first and second rams are connected in parallel.

6. The invention according to claim 4, wherein, said second ram is a single-acting ram, and conduit means connects the head end of both rams.

7. The invention according to claim 4, wherein, said crane has a boom foot carried by the upper, and said first and second rams are located substantially 180° apart and each ram is located substantially 90° from the middle of the boom foot.

8. The invention according to claim 3 and further comprising, the sequence valve for directing hydraulic fluid only to said second ram until a predetermined pressure is achieved and thereafter pressurizing said first ram.

9. The invention according to claim 8 and further comprising a check valve arranged to by-pass said sequence valve when exhausting fluid from the head end of said first ram.

10. An improved arrangement for connecting and disconnecting the upper and lower portions of a crane comprising;
    a retainer carried by the upper;
    a bearing assembly carried by the lower;
    a groove formed in the facing wall of each of said retainer and bearing assembly;
    a split locking ring positionable entirely within one of said grooves and deflectable to also engage the other of said grooves to lock said retainer and bearing assembly together;
    a first hydraulic ram connected between the free ends of said locking ring to deflect the latter; and
    a second hydraulic ram arranged to exert a radial force on said ring to urge said ring into the other of said grooves.

11. The invention according to claim 10, wherein said rams are connected in parallel and said first ram has a smaller diameter than said second ram.

12. The invention according to claim 11, wherein a radial opening is provided in one of said retainer and bearing assembly to communicate with said one groove; a plunger extends through said opening and engages said ring and said second ram to transmit the force from said ram to said ring.

13. The invention accordingly to claim 10, and further comprising;

a sequence valve to direct pressure only to said second ram until a predetermined pressure is reached and thereafter to said first ram.

14. The invention according to claim 13, and further comprising;
a check valve connected in parallel with said sequence valve to by-pass said sequence valve when disconnecting said upper from said lower.

* * * * *